United States Patent
Ishii et al.

(10) Patent No.: US 6,679,800 B1
(45) Date of Patent: Jan. 20, 2004

(54) HYDRAULIC PRESSURE CONTROL METHOD AND APPARATUS OF AN AUTOMATIC TRANSMISSION FOR A VEHICLE

(75) Inventors: Shigeru Ishii, Atsugi (JP); Masashi Sugiuchi, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/691,848

(22) Filed: Oct. 18, 2000

(30) Foreign Application Priority Data

Oct. 18, 1999 (JP) .......................... 11-295308

(51) Int. Cl.$^7$ .............................. F16H 31/00
(52) U.S. Cl. ............... 475/116; 477/161; 192/3.58; 701/55
(58) Field of Search ................ 475/116, 127, 475/69, 70, 118, 120, 123; 192/3.58, 109 F, 85 R; 701/51, 52, 67, 56, 55; 477/161

(56) References Cited

U.S. PATENT DOCUMENTS

| | | | |
|---|---|---|---|
| 4,351,206 A | * 9/1982 | Lemieux et al. | 475/127 |
| 4,470,117 A | * 9/1984 | Miki et al. | 474/12 |
| 4,704,922 A | * 11/1987 | Suketomo et al. | 475/120 |
| 4,956,776 A | 9/1990 | Carre | |
| 4,967,385 A | 10/1990 | Brekkestran et al. | |
| 5,054,599 A | * 10/1991 | Marcott | 137/625.64 |
| 5,213,013 A | * 5/1993 | Fujiwara et al. | 475/120 |
| 5,251,509 A | * 10/1993 | Pollack et al. | 475/127 |
| 5,342,253 A | * 8/1994 | Mizobe et al. | 475/120 |
| 5,404,301 A | * 4/1995 | Slicker | 192/3.3 |
| 5,802,490 A | * 9/1998 | Droste | 192/3.28 |
| 5,871,074 A | * 2/1999 | Easton | 192/109 F |
| 5,957,260 A | * 9/1999 | Kunii | 137/625.65 |
| 6,022,293 A | * 2/2000 | Dourra et al. | 475/127 |
| 6,102,825 A | * 8/2000 | Hisano et al. | 475/118 |
| 6,179,107 B1 | * 1/2001 | Hall, III | 137/596.16 |
| 6,206,802 B1 | * 3/2001 | Kim | 477/127 |
| 6,315,692 B1 | * 11/2001 | Takahashi et al. | 475/116 |
| 6,319,164 B1 | * 11/2001 | Runde et al. | 475/116 |

FOREIGN PATENT DOCUMENTS

| | | |
|---|---|---|
| DE | 199 37 053 | 2/2000 |
| JP | 64-24410 | 2/1989 |
| JP | 05-280623 | 10/1993 |
| JP | 05-312251 | 11/1993 |
| JP | 8-270777 | 10/1996 |
| JP | 09-014485 | 1/1997 |
| JP | 09-100939 | 4/1997 |
| JP | 09-273653 | 10/1997 |
| JP | 11-270731 | 10/1999 |

* cited by examiner

*Primary Examiner*—Rodney H. Bonck
*Assistant Examiner*—David D. Le
(74) *Attorney, Agent, or Firm*—Foley & Lardner

(57) ABSTRACT

A method for controlling hydraulic pressure of an automatic transmission for a vehicle is provided. The automatic transmission has a clutch element engaged by a solenoid pressure to perform speed change. The solenoid pressure is generated by a solenoid that is driven by a solenoid drive current. The method calculates a required clutch engagement pressure and a required solenoid pressure corresponding to the required clutch engagement pressure based on a relationship between the clutch engagement pressure and the solenoid pressure. The method outputs a required solenoid drive current corresponding to the required solenoid pressure based on a relationship between the solenoid pressure and the solenoid drive current. The solenoid outputs the solenoid pressure corresponding to the required solenoid drive current.

6 Claims, 4 Drawing Sheets

$P_O = A \times P_{SOL} + B$

US 6,679,800 B1

HYDRAULIC PRESSURE CONTROL METHOD AND APPARATUS OF AN AUTOMATIC TRANSMISSION FOR A VEHICLE

FIELD OF THE INVENTION

The present invention relates to a hydraulic pressure control method and apparatus for an automatic transmission for a vehicle, in which a signal pressure is produced by an electrical signal, and an output pressure is controlled by this signal pressure.

BACKGROUND OF THE INVENTION

An automatic transmission for a vehicle performs speed changing by selectively engaging a plurality of frictional elements such as clutches and brakes etc. If at this time the engagement pressure for a frictional element is not appropriate, there is a possibility that speed change shock may occur, or that the speed changing response may be slow.

In this connection, it is proposed in Japanese Patent Laying-Open Publication Heisei 8-270777 to perform transition control for the line pressure which engages the frictional elements.

SUMMARY OF THE INVENTION

A hydraulic pressure control circuit for an automatic transmission produces a signal pressure by driving a solenoid, and controls by this signal pressure an engagement pressure for a frictional element which is an output pressure, or a line pressure which controls engagement of a frictional element, so as to perform speed changing. However there is the problem that the relationship between the drive electrical signal for the solenoid and the output pressure cannot be accurately determined, due to variation or individual differences in circuit resistance.

In order to solve this problem, it has been conceived of to store a complete set of data relating to actually measured output pressure for each level of electrical signal within the control device, to derive from this database the value of electrical signal which corresponds to the required value for the output pressure, and to send an electrical signal of this value as a command to the solenoid. In this case, an expanded memory capacity becomes necessary for storing the above database, and the cost is increased.

DESCRIPTION OF THE PREFERRED EMBODIMENT

Figure 1:
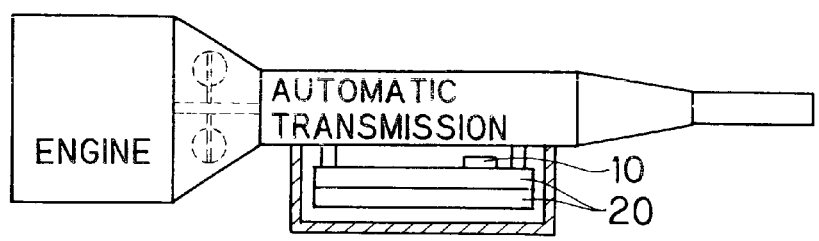
FIG. 1 is a general view of an automatic transmission for a vehicle to which the hydraulic pressure control apparatus according to the present invention is applied.

Referring to FIG. 1, this figure shows a general view of an automatic transmission for a vehicle to which an embodiment of the hydraulic pressure control apparatus according to the present invention is applied. A control device 10 which functions as this hydraulic pressure control apparatus controls a control valve 20, and supplies operating hydraulic fluid at a predetermined pressure level to an automatic transmission which is connected to an engine.

Figure 2:
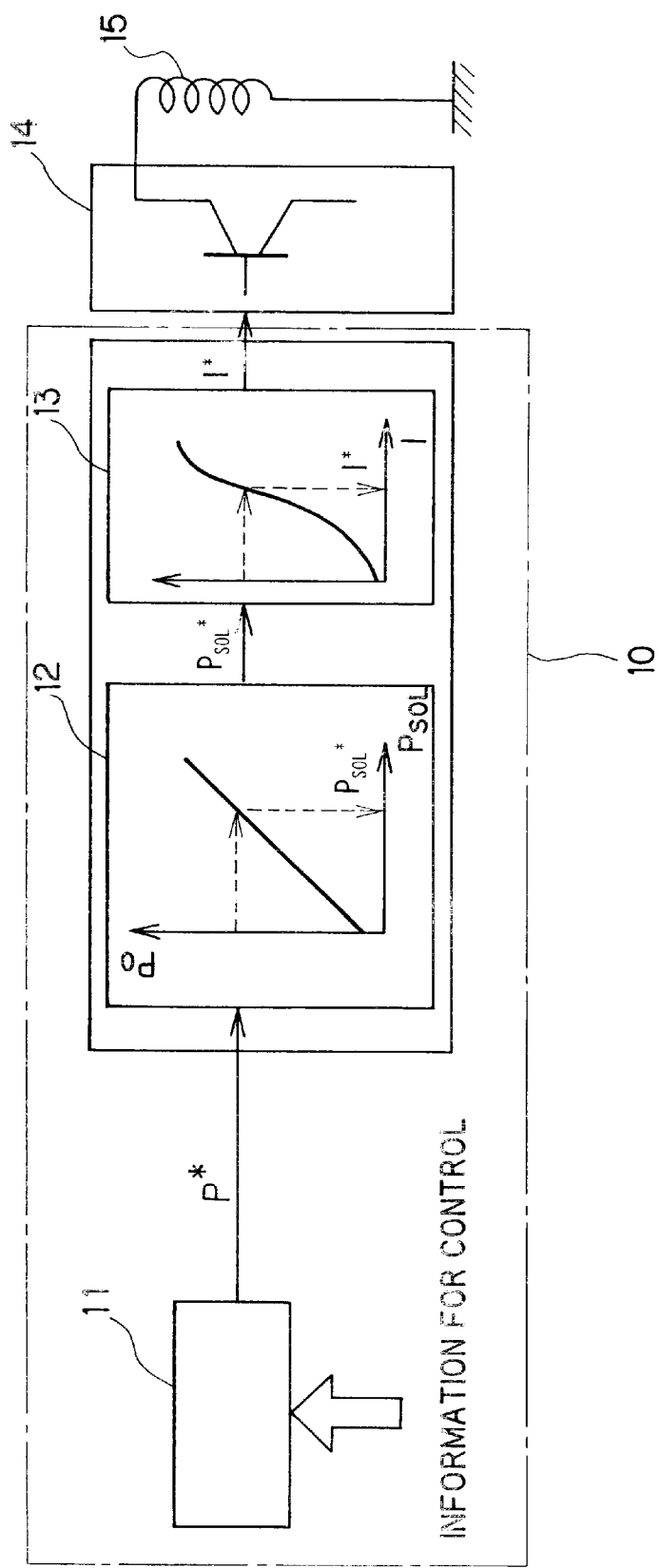
FIG. 2 is a system diagram showing a hydraulic pressure control apparatus of an automatic transmission to which the hydraulic pressure control method according to the present invention is applied.

Referring to FIG. 2, the control device 10 which employs the hydraulic pressure control method of the present invention comprises a clutch engagement pressure required value calculation section 11, a solenoid pressure calculation section 12, a solenoid drive current calculation section 13, a solenoid drive circuit 14, and a solenoid 15.

The clutch engagement pressure required value calculation section 11 inputs various items of information for hydraulic pressure control. Based upon this information, the clutch engagement pressure required value calculation section 11 calculates a required value P* for the clutch engagement pressure as an output pressure which corresponds to the transmission input torque etc.

Based upon a relationship which is derived as will be described in detail hereinafter between a clutch engagement pressure Po and a solenoid pressure $P_{SOL}$ which serves as a signal pressure, the solenoid pressure calculation section 12 derives a required solenoid pressure value $P_{SOL}*$ which corresponds to this clutch engagement pressure required value P*.

The solenoid drive current calculation section 13 derives a required solenoid drive current I* (an electrical signal) for calculating this required solenoid pressure $P_{SOL}$, based upon a main map, derived and stored in advance, which specifies the relationship between a solenoid drive current I and the solenoid pressure $P_{SOL}$.

The clutch engagement pressure required value calculation section 11, the solenoid pressure calculation section 12, and the solenoid drive current calculation section 13 constitute the control device 10 which is fitted as an integral unit to the main body of the automatic transmission.

The required solenoid drive current I* is supplied via the solenoid drive circuit 14 to the solenoid 15, which is a signal pressure generation element. This solenoid 15 controls the opening amount of a control valve 20, and thereby produces the required solenoid pressure $P_{SOL}*$ according to the required solenoid drive current I*.

Further, the hydraulic pressure control apparatus controls the clutch engagement pressure Po by the required solenoid pressure $P_{SOL}*$ so as to bring it to be equal to the clutch engagement pressure required value P*.

Figure 3:
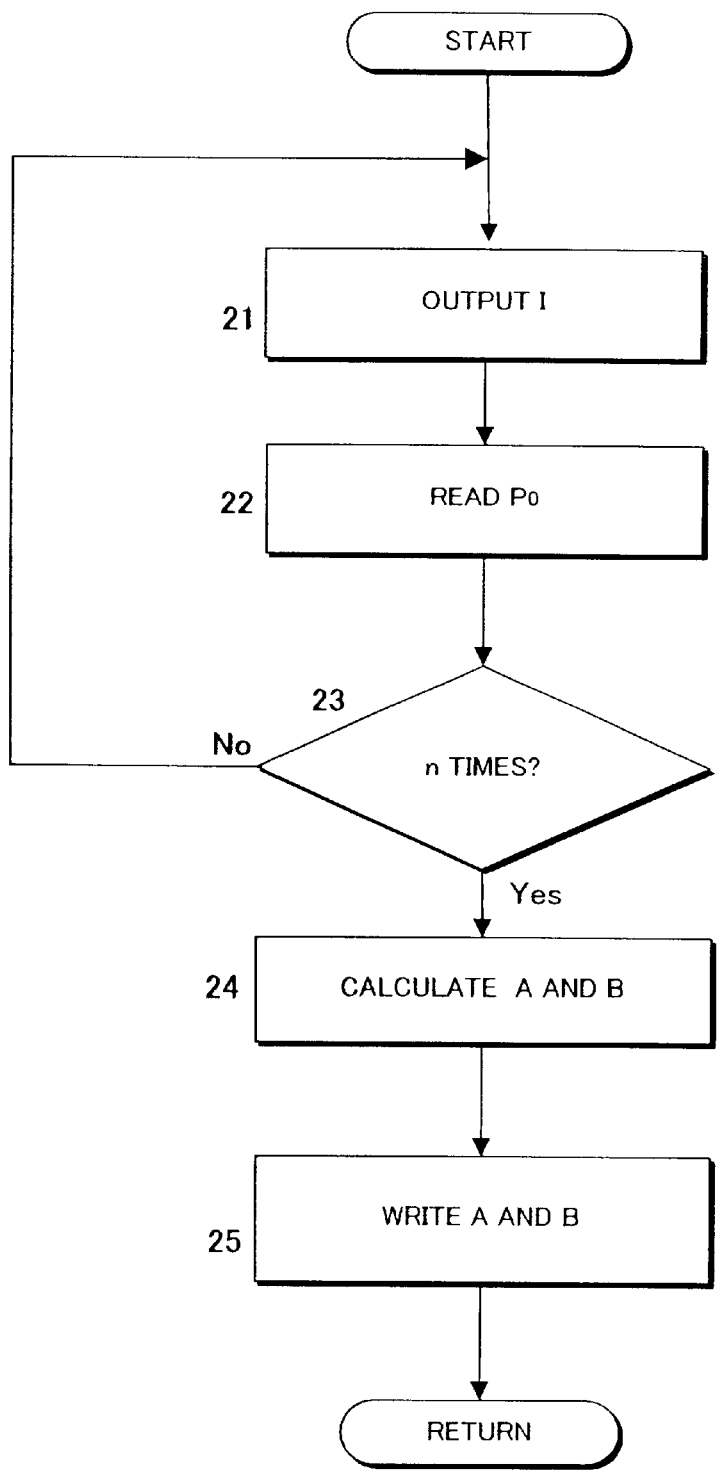
FIG. 3 is a flow chart showing a procedure which determines a relationship between a solenoid pressure and a clutch engagement pressure, according to the preferred embodiment of the present invention.

The relationship between the clutch engagement pressure Po and the solenoid pressure $P_{SOL}$ in the solenoid pressure calculation section 12 is determined during the manufacture of the hydraulic pressure control apparatus by the flow chart shown in FIG. 3, and is stored within the control device 10.

The details of the control by the solenoid pressure calculation section 12 are explained in FIG. 3.

Figure 4A:
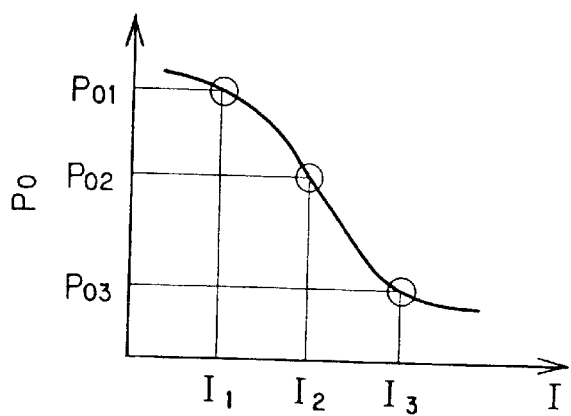
FIGS. 4(a)–4(c) are a set of characteristic graphs used in the process whose flow chart is shown in FIG. 3, of which (a) shows actually measured data values for output pressure, (b) is a main map for a signal pressure, and (c) shows the relationship between signal pressure and output pressure.

This control starts upon the completion of preparations for measurement of the clutch engagement pressure Po, and first in steps 21 and 22 the solenoid drive current I is repeatedly output at each solenoid drive current I which is varied solenoid drive current I, and for each current value the clutch engagement pressure Po is actually measured as shown in FIG. 4(a).

In a step 23 a decision is made as to whether or not this actual measurement has been performed a predetermined number of times n. For example, in the case of the preferred embodiment, n=3.

Figure 4B:
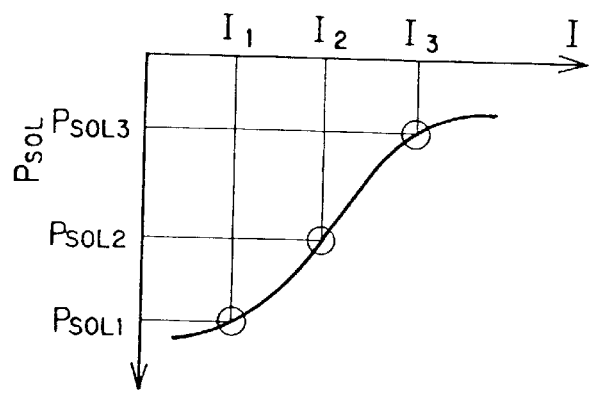

In a step 24, the table map for the solenoid which most closely resembles the actually measured data of FIG. 4(a) is selected as the main map. For example, a solenoid table map which embodies a relationship between the solenoid drive current I and the solenoid pressure $P_{SOL}$ like that shown in FIG. 4(b) is selected as the main map. It should be understood that the drive characteristic of the solenoid is measured in advance during manufacture and stored. A relationship like FIG. 4(c) between the solenoid pressure $P_{SOL}$ and the clutch engagement pressure Po is approximately calculated from these actually measured data of FIG. 4(a) and the main map of FIG. 4(b) as a linear function like Po=A× $P_{SOL}$+B by, for example, the method of least squares. The coefficient A and the constant B in this approximate linear relationship respectively constitute a coefficient for compensation A and and an offset B.

And in a step 25, during manufacture of the hydraulic pressure control apparatus, this coefficient for compensation A and offset B are stored in the control device 10 as a relationship between the clutch engagement pressure Po and the solenoid pressure $P_{SOL}$ for the solenoid pressure calculation section 12. This coefficient for compensation A and offset B are used during the calculation of the required solenoid pressure $P_{SOL}^*$ by the solenoid pressure calculation section 12.

Figure 4C:
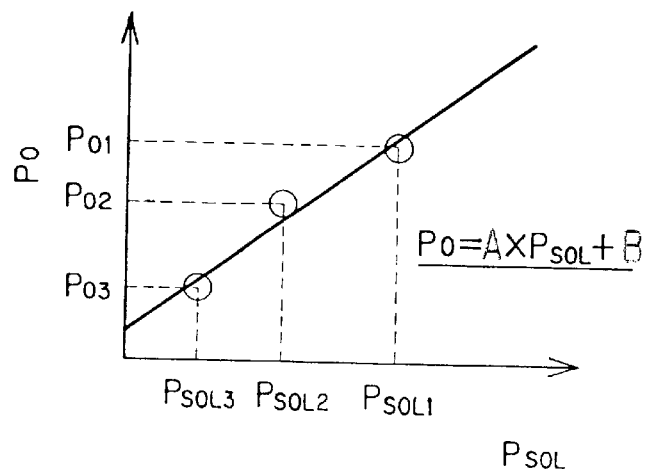

In this manner, first, the required solenoid pressure $P_{SOL}^*$ which corresponds to the clutch engagement pressure required value P* is derived by the solenoid pressure calculation section 12 using the coefficient for compensation A and the offset B, in other words using the relationship shown in FIG. 4(c) between the clutch engagement pressure Po and the solenoid pressure $P_{SOL}$. Next, the case will be considered of deriving the required solenoid drive current I* for generating the required solenoid pressure $P_{SOL}^*$ by the solenoid drive current calculation section 13, based upon the main map which gives the relationship between the solenoid drive current I and the solenoid pressure $P_{SOL}$ shown in FIG. 4(b). In this case, it is possible accurately to control the output pressure Po to the output pressure required value P*, since the relationship shown in FIG. 4(c) between the clutch engagement pressure Po and the solenoid pressure $P_{SOL}$ compensates for deviation of the relationship between the drive current I for the solenoid 15 and the output pressure Po caused by variation or individual differences in circuit resistance.

Moreover, no expanded memory capacity is required, since it is only the relationship between the solenoid pressure $P_{SOL}$ and the clutch engagement pressure Po which is stored in the control device 10, so that it is possible to implement the above described compensation cheaply with a memory of small capacity.

Further, with this embodiment, it becomes possible further to reduce the memory capacity, since the relationship between the solenoid pressure $P_{SOL}$ and the clutch engagement pressure Po is obtained according to the least squares method, and the compensation coefficient A and the compensation offset B between them are stored in the control device 10.

Since the control device is fixed to the automatic transmission and they are formed into one unit, it is possible to record the relationship between the signal pressure and the output pressure in the control device in their original state as separate units before mounting the automatic transmission to the vehicle, and thus by the above described approximate calculation it becomes possible to simplify the automatic transmission yet further.

What is claimed is:

1. A method for controlling hydraulic pressure of an automatic transmission for a vehicle, the automatic transmission having a clutch element engaged by a solenoid pressure to perform speed change and a solenoid driven by a solenoid drive current to generate the solenoid pressure, the method comprising the steps of:

measuring an actual data of a clutch engagement pressure for various solenoid drive current;

selecting a drive characteristic of the solenoid which shows a relationship between the solenoid drive current and the solenoid pressure;

calculating a relationship between the clutch engagement pressure and the solenoid pressure from the actual measured data and the drive characteristic of the solenoid;

calculating a required clutch engagement pressure;

calculating a required solenoid pressure corresponding to the required clutch engagement pressure based on the relationship between the clutch engagement pressure and the solenoid pressure; and outputting a required solenoid drive current corresponding to the required solenoid pressure based on the drive characteristic of the solenoid.

2. The method according to claim 1, further comprising a step of:

calculating the relationship between a clutch engagement pressure and the solenoid pressure as a linear function.

3. The method according to claim 1, wherein the step of measuring an actual data of a clutch engagement pressure for various solenoid drive current is repeated a predetermined number of times.

4. A hydraulic pressure control device of an automatic transmission for a vehicle, the automatic transmission having a clutch element engaged by a solenoid pressure to perform speed change and a solenoid driven by a solenoid drive current to generate the solenoid pressure, the hydraulic pressure control device comprising:

a clutch engagement pressure calculation section configured to calculate a required clutch engagement pressure;

a solenoid pressure calculation section configured to calculate a required solenoid pressure corresponding to the required clutch engagement pressure based on a relationship between a clutch engagement pressure and the solenoid pressure, the relationship between the clutch engagement pressure and the solenoid pressure being calculated from an actual measured data of the clutch engagement pressure and a drive characteristic of the solenoid, the actual data being measured for various solenoid drive current, the drive characteristic of the solenoid showing a relationship between the solenoid drive current and the solenoid pressure; and a solenoid drive current calculation section configured to calculate and output a required solenoid drive current corresponding to the required solenoid pressure based on a relationship between the solenoid pressure and the solenoid drive current.

5. The hydraulic pressure control device according to claim 4, wherein the relationship between the clutch engagement pressure and the solenoid pressure is calculated as a linear function.

6. The hydraulic pressure control device according to claim 4, wherein a predetermined number of actual data measurements is performed to measure the actual data for various solenoid drive current.

* * * * *